UNITED STATES PATENT OFFICE.

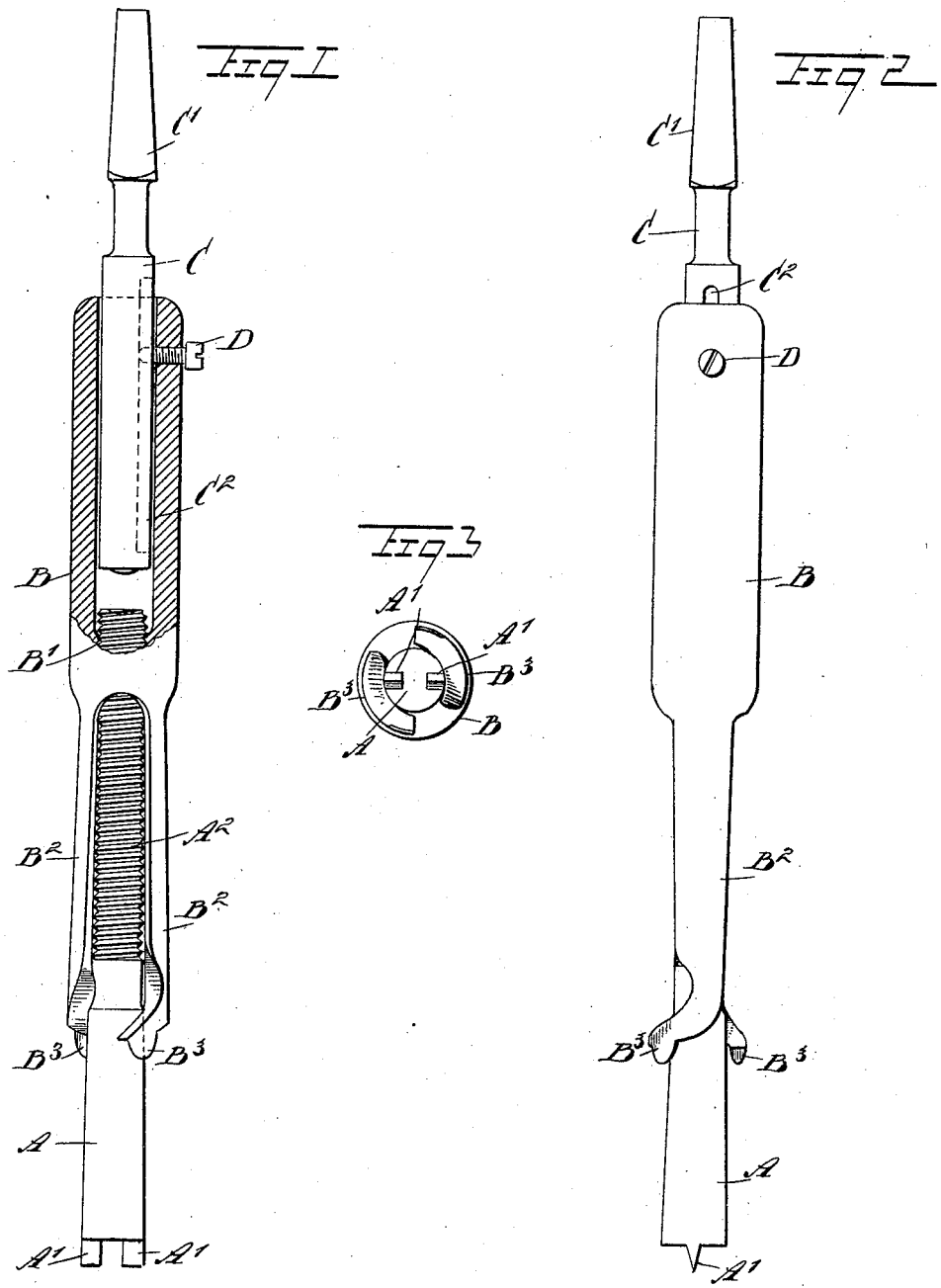

IRVING W. MASON, OF ABERDEEN, WASHINGTON.

TOOL FOR BORING TAPERING HOLES.

SPECIFICATION forming part of Letters Patent No. 603,531, dated May 3, 1898.

Application filed June 3, 1897. Serial No. 639,267. (No model.)

*To all whom it may concern:*

Be it known that I, IRVING W. MASON, of Aberdeen, in the county of Chehalis and State of Washington, have invented a new and Improved Tool for Boring Tapering Holes, of which the following is a full, clear, and exact description.

The object of the invention is to provide a new and improved tool for conveniently and accurately boring or drilling tapering holes in wood, stone, metal, or other materials.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a front elevation of the improvement with parts in section. Fig. 2 is a side elevation of the improvement. Fig. 3 is an inverted plan view of the same.

The improved tool, as illustrated in the drawings, is provided with a tapering center or spindle A, formed at its lower end or base with points A', adapted to be driven into the bottom of a cylindrical hole to be formed into a tapering hole, as hereinafter more fully described in detail.

The upper end of the center or spindle A is provided with a screw-rod $A^2$, screwing in a thread or nut B', formed on the body B of the bit, the said body B being provided with flexible arms $B^2$, each formed at its lower end with a cutter $B^3$, adapted to engage with its inner face the tapering surface of the center A, so as to spread the cutters apart as the bit is advanced longitudinally relatively to the center A. The shank C for the bit is preferably made separate from the body and is fitted to slide loosely therein, the upper end of the shank being formed with the usual polygonal head C', adapted to engage the socket of the brace or other tool for turning the drilling-tool.

In the side of the shank C is formed a groove or recess $C^2$, into which extends a screw D, screwing in the body B and serving to turn the body and cutters when revolved by a brace or other tool engaging the head C' of the shank C, the screw D at the same time permitting a longitudinal sliding of the shank in the body B.

Now in order to bore a tapering hole in wood, metal, stone, or other material the operator first forms with the usual tools an ordinary cylindrical hole in the said material and then inserts the center A in the said hole and drives the points or spurs A' into the bottom of the said hole to hold the center stationary within the said hole. The operator now engages the brace or other tool with the head C' of the shank C and turns the latter, and in doing so causes a turning of the body B and the cutters $B^3$, whereby the body B screws on the screw-rod $A^2$, so that the cutters besides being turned advance longitudinally on the center A and are gradually spread outward, so as to cut a shaving from the wall of the hole, the shaving so cut therefrom increasing gradually in thickness from the top of the hole to the bottom thereof, so as to produce a tapering hole. When this has been done, a turning of the brace or other tool in an opposite direction unscrews the body B on the screw-rod $A^2$, so that the cutters move outwardly on the center A, and owing to the flexibility of the arms $B^2$ close on the tapering center A, so that when the several parts arrive at their previous original position then the tool is again ready for use in boring a second tapering hole.

By having the shank C connected with the body B as described the lower end of the said shank rests on the screw-rod $A^2$, so as to relieve all strain from the threads on the screw-rod $A^2$ and the nut B', and the construction mentioned allows of freely lowering and raising the cutters and at the same time prevent revolving of the cutters on the shank. Furthermore, by the construction described the pins or spurs A' can be readily driven into the bottom of the hole by striking the end of the head C' of the shank C, the lower end of which rests on the upper end of the screw-rod $A^2$, so that the cutters $B^3$, flexible arms $B^2$, and body B are not affected or injured in any way.

It will be seen by the arrangement described a tapering hole, increasing in diameter from the top to the bottom, can be readily produced without any undue strain whatever on the drilling-tool.

Having thus fully described my invention, I claim as new and desire to secure by Letters Patent—

1. A drilling-tool for boring tapering holes, comprising a tapering center or spindle adapted to be held in a fixed position and formed with a screw-rod, a bit having a body into which screws the said screw-rod, the said bit being also provided with flexible arms, and cutters held on the free ends of the said arms and engaging the tapering surface of the said spindle, substantially as shown and described.

2. A drilling-tool for boring tapering holes, comprising a tapering center or spindle adapted to be held in a fixed position and formed with a screw-rod, a bit having a body into which screws the said screw-rod, the said bit being also provided with flexible arms, cutters held on the free ends of the said arms and engaging the tapering surface of the said spindle, and a shank for the said body, and fitted to slide in the said body and adapted to engage the upper end of the said screw-rod, the said shank having connection with the said body for turning the latter, upon turning the shank, substantially as shown and described.

IRVING W. MASON.

Witnesses:
CHARLES L. LEWIS,
M. L. PEARSON.